Aug. 1, 1933.  C. T. SIEBS  1,920,219
SUPPORTING DEVICE
Filed Oct. 17, 1928
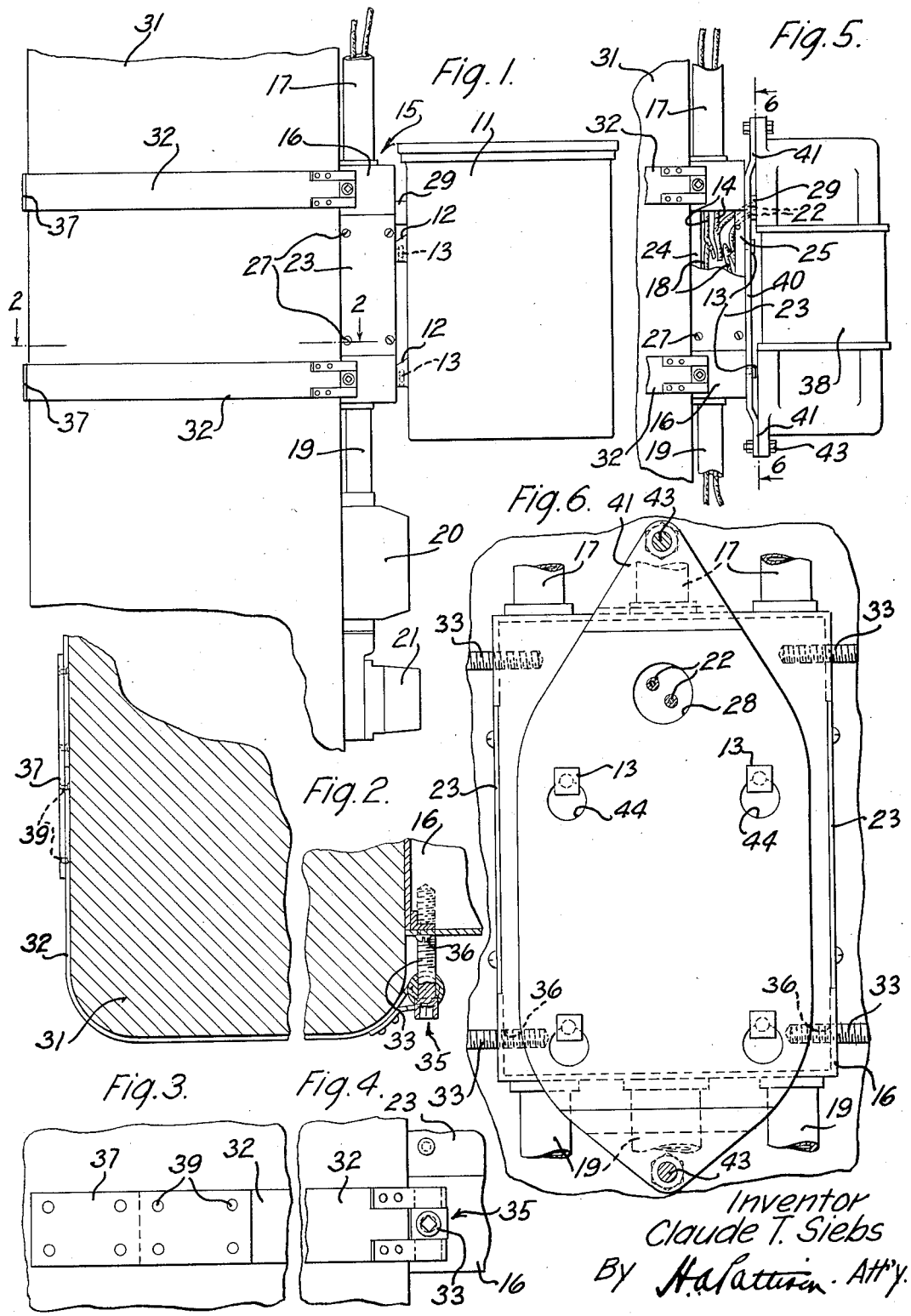
Inventor
Claude T. Siebs
By H. A. Patterson Att'y.

UNITED STATES PATENT OFFICE 1,920,219

SUPPORTING DEVICE

Claude Theodore Siebs, Nutley, N. J., assignor to Western Electric Company, Incorporated, New York, N. Y., a Corporation of New York Application October 17, 1928. Serial No. 312,964

2 Claims. (Cl. 247—9.)

This invention relates to supporting devices and more particularly to a mounting device for an electrical transformer.

An object of the invention is the provision of an inexpensive and efficient support for electrical apparatus which may be quickly and securely mounted and which may be easily connected to and disconnected from its associated electrical circuit.

In accordance with one embodiment of the invention, a junction box is provided of a size such that it will support an electrical transformer through the cooperation of header members on the face thereof and the usually provided slotted lugs on the rear side of the transformer. One side of the junction box is left open thereby exposing the electrical conductors from an adjacent conduit and the conductors of the transformer which may be thus easily and quickly interconnected. Securement of the junction box to a support such as a pillar may be effected by spaced metal straps which are adapted to encircle the pillar and which have swivel bolts at one end thereof by means of which they may be attached to the junction box. The other ends of the straps are overlapped and riveted together on the side of the pillar opposite the junction box and the transformer.

According to another embodiment of the invention an adapter plate which cooperates with the junction box is also provided whereby transformers of a variety of sizes and shapes may be interchangeably mounted upon the junction box.

It is believed that a complete understanding of the invention may be had by reference to the following description taken in conjunction with the accompanying drawing, wherein:

Fig. 1 is a side elevational view of a transformer mounted on a pillar by means of a device embodying this invention;

Fig. 2 is an enlarged fragmentary sectional view taken on line 2—2 of Fig. 1, looking in the direction indicated by the arrows;

Fig. 3 is an enlarged elevational view of a part of the rear of the pillar showing the method of joining the strap ends;

Fig. 4 is an enlarged fragmentary side elevational view of the pillar showing the swivel bolts connecting the straps to the junction box;

Fig. 5 is a fragmentary side elevational view of another type of transformer mounted to a pillar by means of the junction box support and an adapter plate, and Fig. 6 is an enlarged sectional view taken on the line 6—6 of Fig. 5, looking in the direction indicated by the arrows, showing the method of attaching the adapter plate to the junction box support.

Referring now to the drawing wherein like reference characters designate the same parts throughout the several views, the numeral 11 designates a transformer of a well known type having lugs 12—12 formed on one face thereof by means of which the transformer 11 may be secured to projecting headed members 13—13. A supporting device designated generally by the numeral 15 forming one embodiment of this invention includes a junction box 16 having conduits 17—17 and 19—19 running thereto and in which electrical conductors 14—14 and 18—18 running to electrical mains (not shown) and to a condulet 20 and snap switch 21 may be connected to the lead in wires 22—22 of an electrical transformer.

The junction box 16 is made with removable cover plates 23—23 at the sides thereof which cover plates 23—23 are secured to angle iron members 24—24 and 25—25 on the inside of the junction box 16 by means of screws 27, and has an aperture 28 therein by means of which the lead in wires 22—22 of a transformer may enter the junction box 16 through a short conduit 29. In this embodiment of the invention the junction box 16 is secured to a pillar 31 by means of metal straps 32—32. Each of the straps 32 has a swivel bolt 33 affixed to one end thereof, as shown at 35, which may be threaded into apertures 36—36 in the sides of the junction box 16. These straps 32—32 are furnished in lengths such that they will encircle an ordinary size pillar and may be cut to fit by the one who is installing the support, to any desired size and secured together by means of a plate 37 which may be attached thereto by means of rivets 39—39.

In the event that a transformer 38 of a different size and shape is to be mounted, an adapter plate 40 is provided having offset portions 41—41 at each end thereof by means of which the adapter plate 40 may be secured to the transformer 38 with a nut and bolt assembly as shown at 43—43. The adapter plate 40 also has apertures 44—44 formed therein, in a location corresponding to the location of the lugs 12—12 on the transformer 11, into which the headed members 13—13 may be inserted to secure the adapter plate 40 with the transformer 38 thereon, to the junction box 16.

A device of the character described hereinbefore provides as a unitary structure a transformer support together with a junction box and thereby eliminates the necessity of providing these two devices as separate and distinct structures, and further provides a device wherein the conductors running to the transformer are more easily accessible than in mountings of a similar type heretofore provided, and further affords a unitary junction box and transformer support adapted to receive and support interchangeably transformers varying in type, size, form and weight.

What is claimed is:

1. A transformer mounting comprising a junction box, headed members on a face thereof for receiving slotted lugs on a transformer casing, whereby a transformer or other electrical apparatus may be interchangeably mounted on the said junction box, removable side plates on said junction box to permit the joinder of electrical conductors therein, and means for supporting the junction box on a pillar.

2. A transformer mounting comprising a junction box, headed members projecting from the face thereof designed to receive the slotted lugs on a transformer casing, removable side plates for said junction box, and an adapter for interchangeably mounting transformers of different sizes on said headed members.

CLAUDE THEODORE SIEBS.